United States Patent
Ranganath et al.

(10) Patent No.: US 12,190,636 B2
(45) Date of Patent: Jan. 7, 2025

(54) PROGRESSIVE CASCADED FACIAL RECOGNITION

(71) Applicant: NEC Corporation, Tokyo (JP)

(72) Inventors: Kris Ranganath, Sacramento, CA (US); Kannan Veeranan Gandhi, Sacramento, CA (US); Arun Chandrasekaran, Sacramento, CA (US); Rody Bagtes, Sacramento, CA (US)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/767,551

(22) PCT Filed: Oct. 23, 2020

(86) PCT No.: PCT/JP2020/039953
§ 371 (c)(1),
(2) Date: Apr. 8, 2022

(87) PCT Pub. No.: WO2021/079998
PCT Pub. Date: Apr. 29, 2021

(65) Prior Publication Data
US 2024/0071133 A1 Feb. 29, 2024

Related U.S. Application Data

(60) Provisional application No. 62/926,125, filed on Oct. 25, 2019.

(51) Int. Cl.
*G06K 9/00* (2022.01)
*G06F 18/22* (2023.01)
(Continued)

(52) U.S. Cl.
CPC ............ *G06V 40/172* (2022.01); *G06F 18/22* (2023.01); *G06V 10/96* (2022.01); *G06V 10/75* (2022.01)

(58) Field of Classification Search
None
See application file for complete search history.

(56) References Cited

U.S. PATENT DOCUMENTS 9,098,760 B2 * 8/2015 Saito .................... G06V 10/993
9,141,849 B2 * 9/2015 Kono .................... G06V 40/16
(Continued)

FOREIGN PATENT DOCUMENTS

CN 110008673 A 7/2019
JP 2005-084815 A 3/2005
(Continued)

OTHER PUBLICATIONS

International Search Report for PCT Application No. PCT/JP2020/039953, mailed on Jan. 19, 2021.
(Continued)

*Primary Examiner* — Feng Niu
(74) *Attorney, Agent, or Firm* — Sughrue Mion, PLLC (57) ABSTRACT

A device and method for performing a user identification of a user include acquiring a first image of the user. A second image of the user that is associated with a previous user identification of the user is selected. The first image and the second image are compared, and a user identification is performed based on the comparison of the first image the second image.

18 Claims, 3 Drawing Sheets

(51) Int. Cl.
  *G06V 10/96* (2022.01)
  *G06V 40/16* (2022.01)
  *G06V 10/75* (2022.01)

(56) References Cited

U.S. PATENT DOCUMENTS

| | | | | |
|---|---|---|---|---|
| 9,317,530 | B2* | 4/2016 | Papakipos | G06F 16/535 |
| 9,405,978 | B2* | 8/2016 | Besterman | G06V 20/52 |
| 9,542,390 | B2* | 1/2017 | Shankaranarayana | G06F 18/22 |
| 9,652,693 | B2* | 5/2017 | Pozas Trevino | G06V 10/764 |
| 10,013,600 | B2* | 7/2018 | Chen | G06F 18/24 |
| 10,133,915 | B2* | 11/2018 | Garcia | G06V 40/172 |
| 10,733,424 | B2* | 8/2020 | Son | G06V 40/174 |
| 2012/0250950 | A1 | 10/2012 | Papakipos et al. | |
| 2013/0272584 | A1* | 10/2013 | Kono | G06V 20/52 382/118 |
| 2014/0161316 | A1 | 6/2014 | Golan et al. | |
| 2014/0363046 | A1 | 12/2014 | Besterman et al. | |
| 2015/0181387 | A1 | 6/2015 | Shaw | |
| 2015/0317512 | A1* | 11/2015 | Shankaranarayana | G06V 40/172 382/118 |
| 2016/0078313 | A1* | 3/2016 | Pozas Trevino | G06V 20/30 382/218 |
| 2017/0068842 | A1* | 3/2017 | Garcia | G06V 40/161 |
| 2017/0147869 | A1* | 5/2017 | Chen | G06V 40/172 |
| 2018/0285628 | A1* | 10/2018 | Son | G06V 40/171 |
| 2019/0108389 | A1 | 4/2019 | Papakipos et al. | |
| 2019/0197220 | A1* | 6/2019 | Anderson | G09B 7/00 |

FOREIGN PATENT DOCUMENTS

| | | |
|---|---|---|
| JP | 2005-084991 A | 3/2005 |
| JP | 2006-092491 A | 4/2006 |
| JP | 2008-033810 A | 2/2008 |

OTHER PUBLICATIONS

IN Office Action for IN Application No. 202217023639, mailed on Sep. 15, 2022 with English Translation.
Extended European Search Report for EP Application No. 20879733.2, dated on Oct. 17, 2022.
SG Office Action for SG Application No. 11202204030X, mailed on Apr. 25, 2024.

* cited by examiner

PROGRESSIVE CASCADED FACIAL RECOGNITION

This application is a National Stage Entry of PCT/JP2020/039953 filed on Oct. 23, 2020, which claims priority from US Provisional Application 62/926,125 filed on Oct. 25, 2019, the contents of all of which are incorporated herein by reference, in their entirety.

TECHNICAL FIELD

The disclosure relates to progressive cascaded facial recognition.

BACKGROUND ART

In a venue such as an airport, a system may acquire biometric information of users in order to perform user identification and authentication for access control and other functions. For example, a security system may acquire an initial image of a user based on the user performing a check-in process via a check-in kiosk, and may compare the initial image and a passport image of the user. Further, the security system may authenticate the user based on a match score between the initial image and the passport image satisfying a threshold.

As the user moves throughout the airport, the system may acquire additional images of the user for other identification and authentication tasks. For example, the security system may acquire additional images of the user at a baggage drop area, a security area, a boarding area, and/or the like. The security system may compare the additional images of the user with the passport image of the user or the initial image of the user, and may identify and authenticate the user based on respective match scores between the respective additional images and the passport image of the user or the initial image of the user satisfying a threshold. In this way, the system may permit the user to check-in luggage, enter through a security gate, board a plane, and/or the like.

However, the user's appearance may change as the user moves throughout the airport as compared to when the user enters the airport and/or performs the check-in process via the check-in kiosk. For example, the user may put on or take off a hat, may put on or take off glasses, may put on or take off a coat, may adjust his or her hair, may apply and/or remove makeup, and/or may generally appear differently than as compared to the user's passport image or the initial image acquired by the check-in kiosk.

Accordingly, if an image of the user that is acquired after the user changes his or her appearance is compared with an initial image of the user that was acquired before the user changes his or her appearance, then identification accuracy may be reduced and/or identification may become impossible.

SUMMARY

According to some possible implementations, a method for performing a user identification of a user may include acquiring a first image of the user, selecting a second image of the user that is associated with a previous user identification of the user, based on the acquisition of the first image, comparing the first image and the second image, based on the selection of the second image, and performing the user identification, based on the comparison of the first image the second image.

According to some possible implementations, a device for performing a user identification of a user may include a memory configured to store one or more instructions, and one or more processors configured to execute the one or more instructions to acquire a first image of the user, select a second image of the user that is associated with a previous user identification of the user, based on the acquisition of the first image, compare the first image and the second image, based on the selection of the second image, and perform the user identification, based on the comparison of the first image the second image.

According to some possible implementations, a computer-readable medium stores a program including one or more instructions that, when executed by one or more processors of a device, cause the one or more processors to acquire a first image of the user, select a second image of the user that is associated with a previous user identification of the user, based on the acquisition of the first image, compare the first image and the second image, based on the selection of the second image, and perform the user identification, based on the comparison of the first image the second image.

DESCRIPTION OF EXAMPLE EMBODIMENTS

Some implementations herein provide a platform that may acquire an image of a user, and select a particular image to which to compare the acquired image based on a selection metric. By selecting and comparing images of a user based on a selection metric, some implementations can improve the accuracy and reliability of user identification compared with conventional techniques of comparing an image of a user with a previously registered image, such as the user's passport image. Such implementations also can conserve processor and memory resources of authentication devices, improve throughput, and reduce latency associated with user authentication.

Figure 1:
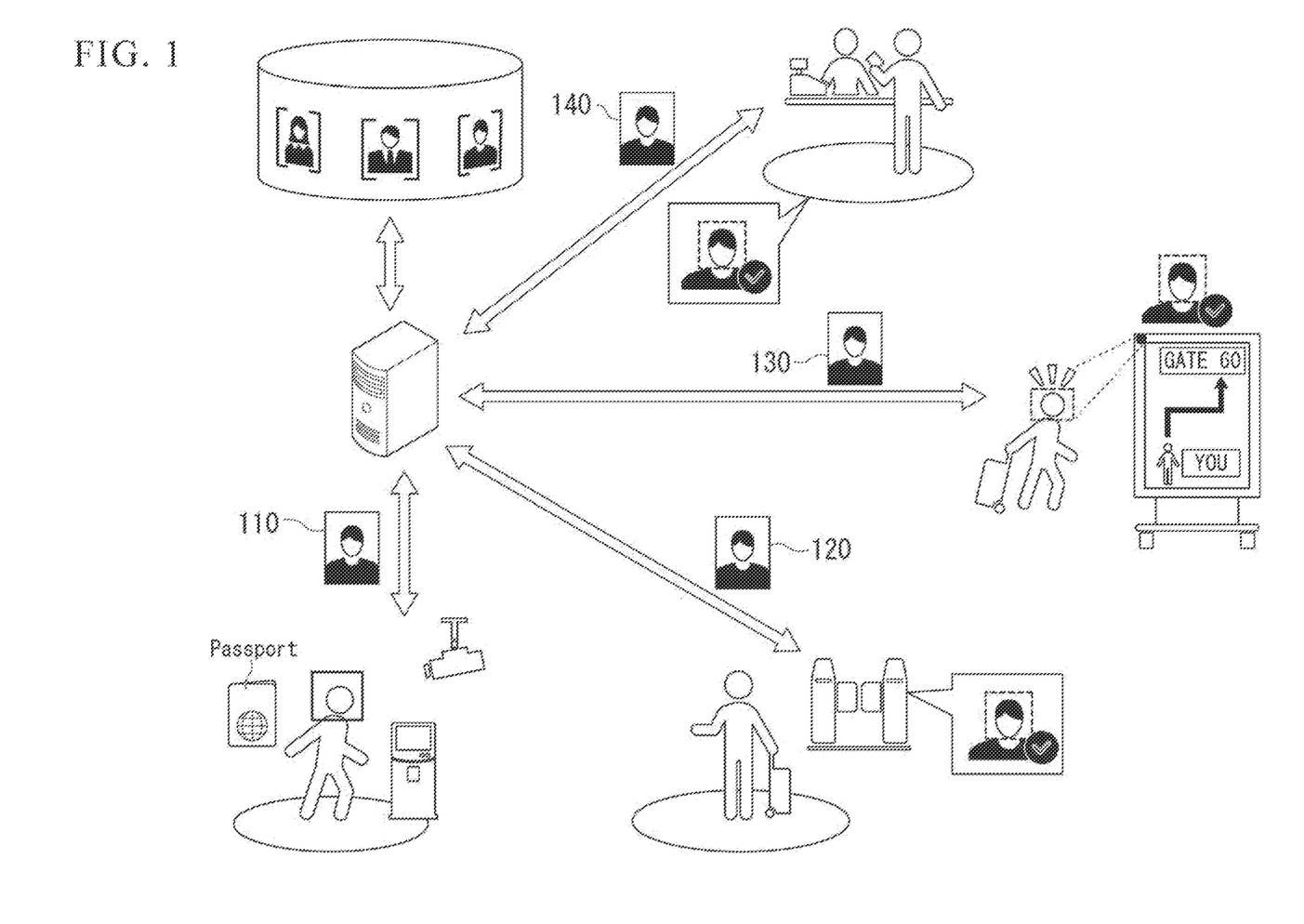
FIG. 1 is a diagram of an overview of an example implementation described herein.

FIG. 1 is a diagram of an overview of an embodiment described herein. FIG. 1 depicts an airport as a particular example of a venue in which systems and implementations described herein may be implemented.

As shown in FIG. 1, a user may enter the airport, and may perform a check-in process via a check-in kiosk. For example, the user may interact with a check-in kiosk to perform a check-in process at the airport, and the check-in kiosk may scan a passport of the user and identify a user identifier of the user. An image acquisition device of the check-in kiosk may acquire an image 110 of the user based on the user performing the check-in process, and may transmit the image 110 and the user identifier to a platform.

The platform may store user information including a passport image of the user and the user identifier of the user. The platform may receive the image 110 and the user identifier of the user from the image acquisition device, and may identify the user information associated with the user based on the user identifier.

The platform may select an image to which to compare the image 110 in order to perform user identification. In this case, the system may select the passport image of the user as the image to be compared because the passport image is associated with an authenticated user. Further, at this point, the passport image of the user may be the only image included in the stored user information of the user.

The platform may compare the image 110 of the user and the passport image, and determine a match score that is indicative of whether the user in the image 110 is the same user as in the passport image. Further, the platform may perform a user identification of the user based on the match score satisfying a threshold. Further still, the platform may cause the check-in kiosk to issue a boarding pass for the user based on performing the user identification. Further still, the platform may update the stored user information to include the image 110 of the user.

After performing the check-in process, the user may move towards a security gate. An image acquisition device located at the security gate may acquire an image 120 of the user based on the user being located at the security gate, and may transmit the image 120 to the platform.

The platform may receive the image 120 of the user from the image acquisition device, and select an image to which to compare the image 120 in order to perform user identification based on a selection metric that corresponds to a most recent image. In this case, the platform may select the image 110 of the user as the image to be compared because the image 110 is the most recent image of the user that was used in association with a previous user identification. In other words, the image 110 satisfies the selection metric.

The platform may compare the image 120 of the user and the image 110 of the user, and determine a match score. Further, the platform may perform a user identification of the user based on the match score satisfying a threshold. Further still, the platform may cause the security gate to open based on performing the user identification. Further still, the platform may update the stored user information to include the image 120 of the user. In this way, the security gate may open substantially automatically based on the user being disposed near the security gate, thereby allowing the user to enter through the security gate without performing any procedures.

After entering the security gate, the user may move towards an airport map device. An image acquisition device located near the airport map device may acquire an image 130 of the user based on the user being located near the airport map device, and may transmit the image 130 to the platform.

The platform may receive the image 130 of the user from the image acquisition device, and select an image to which to compare the image 130 based on the selection metric in order to perform user identification. In this case, the platform may select the image 120 of the user as the image to be compared because the image 120 is the most recent image of the user that was used in association with a previous user identification. In other words, the image 120 satisfies the selection metric.

The platform may compare the image 130 of the user and the image 120 of the user, and determine a match score. Further, the platform may perform a user identification of the user based on the match score satisfying a threshold. Further still, the platform may update the stored user information to include the image 130 of the user. After passing the airport map device, the user may move to an airport store. An image acquisition device may acquire an image 140 of the user based on the user being located at the airport store, and may transmit the image 140 to the platform.

The platform may receive the image 140, and may select an image to which to compare the image 140 based on the selection metric in order to perform user identification. In this case, the platform may select the image 130 as the image to be compared because the image 130 is the most recent image of the user that is associated with a previous user identification. In other words, the image 130 satisfies the selection metric.

The platform may compare the image 140 and the image 130, and determine a match score. Further, the platform may determine that the match score satisfies a threshold, and may perform a user identification of the user based on the match score satisfying the threshold. The platform may update the user information to include the image 140 of the user based on performing the user identification.

Based on performing the various user identifications, the platform may update stored user information, may cause devices to perform functions, may update a status of the user, may transmit messages to other devices, and/or the like.

In this way, some implementations herein permit a user identification based on comparing an nth acquired image and a n−1th acquired image of a user, where n is an integer between 1 and m, where m is a total number of images taken of the user. In this way, some implementations herein improve accuracy of user identification by utilizing temporally related images of the user for authentication. Although certain implementations are described as selecting an n−1th image for comparison, and comparing an nth acquired image and the selected n−1th acquired image of a user, other implementations may select images other than the n−1th image to compare with the nth image using a different or additional selection metric as described in more detail elsewhere herein.

Figure 2:
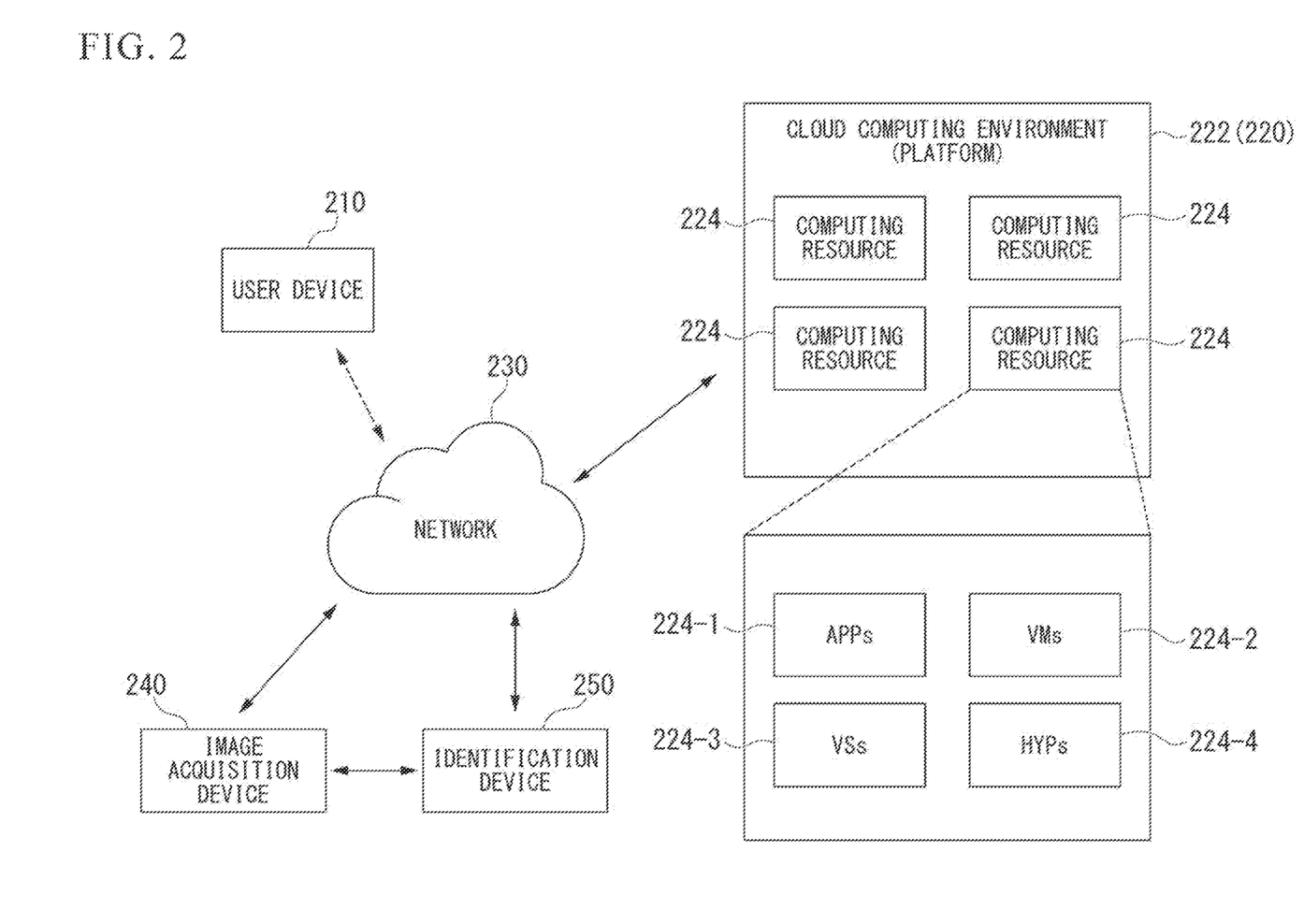
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a platform 220, a network 230, an image acquisition device 240, and an identification device 250. Devices of environment 200 may interconnect via wired connections, wireless connections, or a combination of wired and wireless connections.

User device 210 includes one or more devices capable of receiving, generating, storing, processing, and/or providing information associated with platform 220. For example, user device 210 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, user device 210 may receive information from and/or transmit information to platform 220.

Platform 220 includes one or more devices capable of performing a user identification of a user, as described elsewhere herein. In some implementations, platform 220 may include a cloud server or a group of cloud servers. In some implementations, platform 220 may be designed to be modular such that certain software components may be swapped in or out depending on a particular need. As such, platform 220 may be easily and/or quickly reconfigured for different uses.

In some implementations, as shown, platform 220 may be hosted in cloud computing environment 222. Notably, while implementations described herein describe platform 220 as being hosted in cloud computing environment 222, in some implementations, platform 220 is not be cloud-based (i.e., may be implemented outside of a cloud computing environment) or may be partially cloud-based.

Cloud computing environment 222 includes an environment that hosts platform 220. Cloud computing environment 222 may provide computation, software, data access, storage, etc. services that do not require end-user (e.g., user device 210) knowledge of a physical location and configuration of system(s) and/or device(s) that hosts platform 220. As shown, cloud computing environment 222 may include a group of computing resources 224 (referred to collectively as "computing resources 224" and individually as "computing resource 224").

Computing resource 224 includes one or more personal computers, workstation computers, server devices, or other types of computation and/or communication devices. In some implementations, computing resource 224 may host platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, or the like.

Application 224-1 includes one or more software applications that may be provided to or accessed by user device 210, image acquisition device 240, and/or identification device 250. Application 224-1 may eliminate a need to install and execute the software applications on user device 210. For example, application 224-1 may include software associated with platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program, and may support a single process. In some implementations, virtual machine 224-2 may execute on behalf of a user (e.g., user device 210), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems, and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

Image acquisition device 240 includes one or more devices capable of acquiring an image of a user. For example, image acquisition device 240 may include a camera device, a sensor device, a security device, a computing device, a mobile phone, a wearable device, or a similar device. In some implementations, image acquisition device 240 may receive information from and/or transmit information to platform 220.

Identification device 250 includes one or more devices capable of performing a user identification of a user. For example, identification device 250 may include a computing device, a server, a mobile phone, a wearable device, or a similar device. In some implementations, identification device 250 may receive information from and/or transmit information to image acquisition device 240 and/or platform 220.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
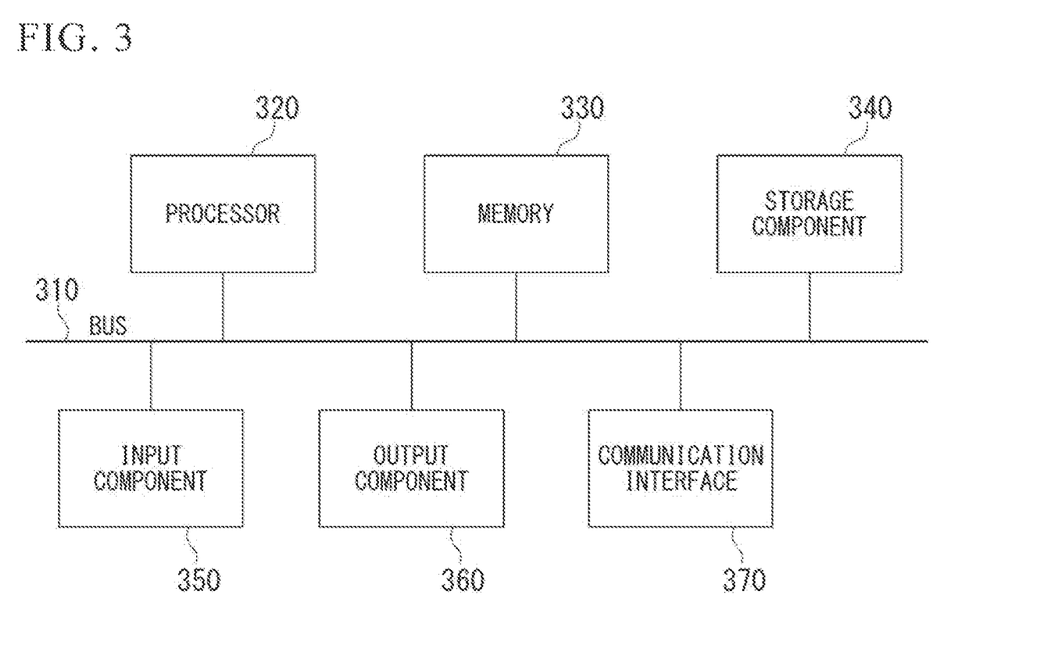
FIG. 3 is a diagram of example components of one or more devices of FIG. 2.

FIG. 3 is a diagram of example components of a device 300. Device 300 may correspond to user device 210, platform 220, image acquisition device 240, and/or identification device 250. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
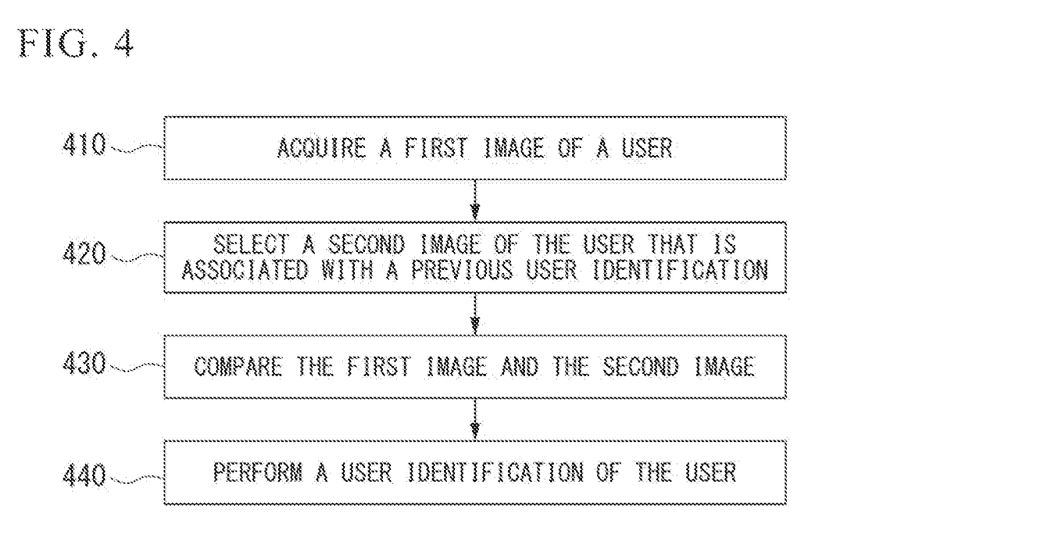
FIG. 4 is a flow chart of an example process for performing a user identification of a user.

FIG. 4 is a flow chart of an example process 400 for performing a user identification of a user. In some implementations, one or more process blocks of FIG. 4 may be performed by platform 220. In some implementations, one or more process blocks of FIG. 4 may be performed by another device or a group of devices separate from or including platform 220, such as user device 210, image acquisition device 240, and/or identification device 250.

As shown in FIG. 4, process 400 may include acquiring a first image of a user (block 410). For example, platform 220 may acquire a first image of a user in order to perform an identification of the user.

The platform 220 may acquire an image of a user from an image acquisition device 240. For example, an image acquisition device 240 may acquire an image of a user, and may provide the image to the platform 220. The platform 220 may acquire an image from an image acquisition device 240 based on a request for an image, based on the image acquisition device 240 acquiring the image, based on an input to a user device 210, based on a timeframe, based on a condition, and/or the like.

The image acquisition device 240 may be disposed at a venue. For example, the venue may include an airport, an amusement park, a stadium, an office, a building, a shopping mall, an arena, a museum, a resort, a cruise ship, a train station, a transit system, a school, a town, a city, a state, a region, a country, and/or the like. The venue may include image acquisition devices 240 that are disposed at various areas of the venue. For example, the venue may include an image acquisition device 240 disposed at an entrance area, at an exit area, at an intermediate area, or the like.

The venue may include a predetermined sequence of image acquisition devices 240. For example, the venue may include a predetermined route for a user to navigate, and image acquisition devices 240 may be disposed in a predetermined sequence along the predetermined route. In this case, the user may pass one or more image acquisition devices 240 in substantially the predetermined sequence. Alternatively, the venue may include a non-predetermined sequence of image acquisition devices 240. For example, the venue may include any number of routes that the user may navigate. In this case, the user may pass one or more image acquisition devices 240 in any number of sequences.

An image acquisition device 240 may acquire the first image of the user based on the user being within a predetermined distance of the image acquisition device 240, based on the user interacting with a device in which the image acquisition device 240 is disposed, based on the user entering the venue, based on the user interacting with the image acquisition device 240, based on the user interacting with user device 210, and/or the like.

The first image of the user may refer to any image of the user that is capable of being used by the platform 220 to perform a user identification of the user. In some implementations, the first image may correspond to the temporally first image of the user that is acquired by an image acquisition device 240 at a venue. Additionally, or alternatively, the first image may correspond to an image of the user that is acquired by a first image acquisition device 240 in a predetermined sequence of image acquisition devices 240. Alternatively, the first image may correspond to an image of the user that is acquired by an nth image acquisition device 240 in the predetermined sequence of image acquisition devices 240 (e.g., where n is equal to or greater than 2).

The first image of the user may include biometric information of the user. For example, the first image of the user may include a facial image, an iris image, a body image, a partial body image, or the like. The first image of the user may include any type of image that may be used to identify the user based on biometric information associated with the first image. In some implementations, the platform 220 may utilize multiple images or video data to perform a user identification.

The first image of the user may be associated with metadata. For example, the first image of the user may be associated with a timestamp that identifies an acquisition time of the first image. Additionally, or alternatively, the first image may be associated with a device identifier of the image acquisition device 240 that acquired the first image of the user (e.g., a serial number, an Internet protocol (IP) address, a media access control (MAC) address, and/or the like). Additionally, or alternatively, the first image may be associated with a location identifier that identifies a particular location of the venue in which the first image was acquired. Additionally, or alternatively, the first image may be associated with a sequence identifier that identifies a position of the first image in a predetermined sequence.

The image acquisition device 240 may acquire the first image of the user, and may transmit the first image of the user to the platform 220. The platform 220 may acquire the first image of the user based on receiving the first image of the user from the image acquisition device 240. In this way, the platform 220 may perform a user identification of the user based on the first image, as described in more detail below.

As further shown in FIG. 4, process 400 may include selecting a second image of the user that is associated with a previous user identification of the user (block 420). For example, the platform 220 may select a second image that is to be compared to the first image in order to perform the identification of the user based on a selection metric.

The second image of the user may refer to an image that is associated with a previous user identification of a user. For example, the second image may refer to an image that is associated with an already identified user. In other words, the platform 220 may have already performed a user identification of a user using an image, and the image that was used to perform the user identification may correspond to the second image.

The platform 220 may store user information that identifies a user. The user information may include a user identifier of a user (e.g., a name, a number, a social security number, a passport identifier, a license number, an employee identifier, and/or the like). Additionally, the user information may include an image of the user. For example, the user information may include an image of the user that was not acquired at the venue (e.g., a passport image, a license image, a membership image, an employee image, and/or the like). Additionally, the user information may include an image of the user that was acquired at the venue. For example, the user information may include one or more images (e.g., second images) of the user that were acquired by image acquisition devices 240 of the venue, and used by the platform 220 to identify the user. The platform 220 may store user information associated with hundreds, thousands, millions, etc., of users.

The platform 220 may initially store user information that includes a user identifier, and an initial image of the user. The platform 220 may acquire an image of the user that was acquired by an image acquisition device 240 of the venue, perform a user identification of the user using the image, and update the user information to include the image. Further, the platform 220 may update the user information to include metadata associated with the image.

The platform 220 may iteratively update the user information based on performing user identifications of the user. For example, the platform 220 may perform n user identifications of the user, and store user information including at least n images of the user that correspond to the images used to perform the respective n user identifications. Alternatively, the platform 220 may perform n user identifications, and store more or less than n images of the user. For example, the platform 220 may store the most recent image that was used to perform the most recent user identification, may store the p most recent images that were used to perform the m most recent user identifications, may store q images that are associated with quality scores that satisfy a threshold, may store m images that are associated with match scores that satisfy a threshold, and/or the like.

In some implementations, the platform 220 may identify user information from which to select the second image. Further, in some implementations, the platform 220 may identify and utilize an entire set of user information of an entire set of users for which the platform 220 stores user information. For example, the platform 220 may store user information of n users, and may compare the first image to n second images of the respective n users.

Alternatively, the platform 220 may compare the first image and a subset of user information of a subset of users for which the platform 220 stores user information. For example, the platform 220 may store user information of n users, and may compare the first image to m second images of m users (e.g., where m<n).

The platform 220 may identify the subset of user information for which to compare the first image. In some implementations, the platform 220 may identify the subset of user information for which to compare the first image based on a user identifier. For example, the platform 220 may receive a user identifier of the user associated with the first image, and may identify the user information associated with the user identifier. In this case, the platform 220 may identify a single set of user information (e.g., m=1) to which to compare the first image based on receiving the user identifier.

Alternatively, the platform 220 may identify the subset of user information for which to compare the first image based on an identifier of the image acquisition device 240 that acquired the first image. For example, the platform 220 may identify a location identifier of the image acquisition device 240, and identify an image acquisition device 240 that is adjacent to the image acquisition device 240 that acquired the first image. Further, the platform 220 may identify user information associated with a user that was identified based on an image acquired by the adjacent image acquisition device 240.

Alternatively, the platform 220 may identify the subset of user information for which to compare the first image based on a sequence identifier of the image acquisition device 240 that acquired the first image. For example, the platform 220 may identify a sequence identifier of the image acquisition device 240, and identify an image acquisition device 240 that includes a lower sequence number than as compared to the sequence number. Further, the platform 220 may identify user information associated with a user that was identified based on an image acquired by the image acquisition device 240 having the lower sequence number.

Alternatively, the platform 220 may identify the subset of user information for which to compare the first image based on identifying users that are likely to visit the venue, users that are likely disposed at the venue, users that performed a reservation procedure, users that performed a check-in procedure, users that are associated with a threshold score, users that are travelling to the venue, and/or the like. In some implementations, the platform 220 may receive data from an external server or third party server, and identify the subset of user information based on the received data (e.g., travel information, employment information, location information, device information, credit card information, reservation information, etc.).

The platform 220 may identify user information of a user to which to compare the first image, and may select a second image of the user information of which to compare the first image. The platform 220 may select a second image based on a selection metric.

In some implementations, the selection metric may be associated with a most recent image. For example, the user information of a user may include n second images of the user associated with n previous user identifications of the user. In this case, the platform 220 may identify a most recent image of the n second images based on metadata of the n second images (e.g., acquisition times of the n images). By selecting the most recent second image, the platform 220 may improve the accuracy of user identification by comparing the first image to a most recent second image that might reflect how the user appears in the first image. In other words, the user may appear substantially similar in the first image and the second image because the first image and the second image may be acquired relatively close in time.

In some implementations, the selection metric may be associated with a time frame. For example, the platform 220 may identify a first acquisition time of the first image and identify a second image acquisition time of a second image, and identify that a timeframe associated with the first acquisition time and the second acquisition time satisfies a threshold. In this case, the platform 220 may select the second image based on identifying that the timeframe satisfies the threshold (e.g., is less than an hour, is less than 10 minutes, etc.).

In some implementations, the selection metric may be associated with a location identifier of an image acquisition device 240 that acquired the second image. For example, the platform 220 may identify a location identifier of a first image acquisition device 240 that acquired the first image, and may identify a location identifier of a second image acquisition device 240 that acquired the second image. In this case, the platform 220 may select the second image based on the first location identifier and the second location identifier. As examples, the platform 220 may identify that the first image acquisition device 240 and the second image acquisition device 240 are adjacent to each other, are located within a threshold distance, and/or the like. As another example, the platform 220 may identify that a distance between the first image acquisition device 240 and the second image acquisition device 240 satisfies a threshold. As another example, the platform 220 may identify that an acquisition location of the second image is the closest location to an acquisition location of the first image.

In some implementations, the selection metric may be associated with a sequence identifier. For example, the platform 220 may identify a first sequence identifier of a first image acquisition device 240 that acquired the first image, and may identify a second sequence identifier of a second image acquisition device 240 that acquired the second image. In this case, the platform 220 may select the second image based on the first sequence identifier and the second sequence identifier. As an example, the image acquisition devices 240 may be associated with a predetermined sequence (e.g., 1 through n), and may include sequence identifiers corresponding to the predetermined sequence. Further, the platform 220 may identify the second image acquisition device 240 that includes the second sequence identifier that is before the first sequence identifier of the first image acquisition device 240.

In some implementations, the selection metric may be associated with a quality score that is indicative of an image quality of the second image. For example, the platform 220 may identify a quality score of the second image. In this case, the platform 220 may select the second image based on the quality score satisfying a threshold.

In some implementations, the selection metric may be associated with a match score that is indicative of a match score associated with the second image. For example, the platform 220 may identify a match score associated with the previous user identification of the second image. In this case, the platform 220 may select the second image based on the match score satisfying a threshold.

The platform 220 may select a second image based on any one or more of the foregoing selection metrics, and may compare the first image and the selected second image as described below.

As further shown in FIG. 4, process 400 may include comparing the first image and the second image (block 430). For example, the platform 220 may compare the first image and the second image to determine whether a user in the first image is the same as a user in the second image.

In some implementations, the platform 220 may compare the first image and the second image using any type of image comparison technique, image processing technique, computer vision technique, machine learning technique, and/or the like.

In some implementations, the platform 220 may compare the first image and the second image, and determine a match score. The match score may be indicative of whether the user in the first image is the same user as in the second image. The match score may include a numerical value (e.g., 0, 50, 80, 100, etc.).

In this way, the platform 220 may determine a match score, and perform a user identification, as described below.

As further shown in FIG. 4, process 400 may include performing the user identification (block 440). For example, the platform 220 may perform a user identification to identify the user in the first image.

In some implementations, the platform 220 may perform the user identification of the user based on identifying user information that is associated with the greatest match score. For example, the platform 220 may compare the first image of the user and second images corresponding to the user information (e.g., the entire set of user information or the subset of user information), and identify particular user information that is associated with the greatest match score. In this case, the platform 220 may perform the user identification by identifying that the user, associated with user information including the greatest match score, is the user in the first image.

In some implementations, the platform 220 may perform the first identification of the user based on receiving a user identifier of the user, comparing the first image of the user and a second image that is associated with the user identifier, and determining that a match score satisfies a threshold value. For example, the user may input information identifying the user (e.g., a name, credit card information, a badge number, etc.), and the platform 220 may receive the input information. Further, the platform 220 may identify user information that is associated with the user identifier, and identify a second image that is associated with user identifier. Then, the platform 220 may compare the first image of the user and the stored image that is associated with the user identifier. In this way, the platform 220 might only be required to perform a single image comparison, thereby potentially conserving computation resources.

In some implementations, the platform 220 may update the user information associated with the user based on performing the user identification. For example, the platform 220 may store the first image of the user and metadata associated with the first image. In this way, the platform 220 may use the first image of the user when performing additional user identifications of the user.

In some implementations, the platform 220 may cause an action to be performed based on the user identification. For example, the platform 220 may cause a security gate to open to permit the user to access an area of the venue. As another example, the platform 220 may cause a check-in kiosk to print a boarding pass. As yet another example, the platform 220 may transmit authentication information to another device.

In some implementations, the platform 220 may iteratively perform the operations of process 400 based on the user moving through the venue. That is, the platform 220 may iteratively acquire additional images of the user, select images to which the additional images are to be compared (e.g., based on selection metrics discussed above), and perform additional user identifications of the user.

In some implementations, the platform 220 may determine an aggregate match score. The aggregate match score may refer to a match score that is an aggregate of multiple match scores. For example, the platform 220 may determine a first match score associated with a first user identification of the user, and may store the user information to include the first match score. Further, the platform 220 may determine a second match score associated with a second user identification of the user, and may determine an aggregate match score based on the first match score and the second match score. The platform 220 may determine the aggregate match score by using any type of mathematical operation using the first match score and the second match score.

In some implementations, the platform 220 may use the aggregate match score when performing additional user identifications. Additionally, the platform 220 may iteratively update the aggregate match score based on performing additional user identifications of the user. In this way, the platform 220 may improve the accuracy of user identification by utilizing an aggregate match score.

In some implementations, the platform 220 may receive images acquired by image acquisition devices 240 that are disposed at a venue, and perform the user identifications using the acquired images based on a selection metric. As an alternative, an image acquisition device 240 may be associated with an identification device 250 that is disposed near (or integrated with) the image acquisition device 240, and the identification device 250 may be configured to perform operations of the platform 220.

In this case, a first identification device 250 may perform a first identification of a user using a first image acquired by a first image acquisition device 240, and may cause the first image to be transmitted to other identification devices 250 that are disposed near (e.g., within a threshold distance) of the first identification device 250, that include a sequence identifier that satisfies a predetermined relationship with a sequence identifier of the first image acquisition device 250, and/or the like. In this way, another identification device 250 may receive user images before a user arrives at an area associated the identification device 250, and utilize the received image to perform user identification. Further, in this way, an identification device 250 may conserve memory and processor resources by storing a reduced amount of user information.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

The example embodiments described above may also be described entirely or in part by the following supplementary notes, without being limited to the following.

(Supplementary Note 1)

A method for performing a user identification of a user, the method comprising:
  acquiring a first image of the user;
  selecting a second image of the user that is associated with a previous user identification of the user, based on the acquisition of the first image;

comparing the first image and the second image, based on the selection of the second image; and
performing the user identification, based on the comparison of the first image the second image.

(Supplementary Note 2)

The method of supplementary note 1, further comprising:
identifying that a timeframe associated with a first acquisition time of the first image and a second acquisition time of the second image satisfies a threshold; and
wherein the selection of the second image comprises selecting the second image based on identifying that the timeframe satisfies the threshold.

(Supplementary Note 3)

The method of supplementary note 1, further comprising:
identifying that the second image is a most recent image of the user for which the previous user identification has been performed; and
wherein the selection of the second image comprises selecting the second image based on identifying that the second image is the most recent image of the user.

(Supplementary Note 4)

The method of supplementary note 1, further comprising:
identifying that a distance associated with a first acquisition location of the first image and a second acquisition location of the second image satisfies a threshold; and
wherein the selection of the second image comprises selecting the second image based on identifying that the distance satisfies the threshold.

(Supplementary Note 5)

The method of supplementary note 1, further comprising:
identifying a predetermined sequence of image acquisition devices; and
wherein the selection of the second image comprises selecting the second image based on identifying the predetermined sequence of image acquisition devices.

(Supplementary Note 6)

The method of supplementary note 1, further comprising:
acquiring a third image of the user;
selecting the first image to be compared to the third image, based on the first image being acquired more recently than as compared to the second image;
comparing the third image and the first image, based on the selection of the third image; and
performing another user identification of the user, based on the comparison of the third image and the first image.

(Supplementary Note 7)

The method of supplementary note 1, further comprising:
identifying that a second acquisition location of the second image is a closest acquisition location to a first acquisition location of the first image; and
wherein the selection of the second image comprises selecting the second image based on identifying that the second acquisition location of the second image is the closest acquisition location to the first acquisition location.

(Supplementary Note 8)

A device for performing a user identification of a user, the device comprising:
a memory configured to store one or more instructions; and
one or more processors configured to execute the one or more instructions to: acquire a first image of the user;
select a second image of the user that is associated with a previous user identification of the user, based on the acquisition of the first image;
compare the first image and the second image, based on the selection of the second image; and
perform the user identification, based on the comparison of the first image the second image.

(Supplementary Note 9)

The device of supplementary note 8, wherein the one or more processors are further configured to:
identify that a timeframe associated with a first acquisition time of the first image and a second acquisition time of the second image satisfies a threshold; and
wherein the one or more processors, when selecting the second image, are further configured to select the second image based on identifying that the timeframe satisfies the threshold.

(Supplementary Note 10)

The device of supplementary note 8, wherein the one or more processors are further configured to:
identify that the second image is a most recent image of the user for which the previous user identification has been performed; and
wherein the one or more processors, when selecting the second image, are further configured to select the second image based on identifying that the second image is the most recent image of the user.

(Supplementary Note 11)

The device of supplementary note 8, wherein the one or more processors are further configured to:
identify that a distance associated with a first acquisition location of the first image and a second acquisition location of the second image satisfies a threshold; and
wherein the one or more processors, when selecting the second image, are further configured to select the second image based on identifying that the distance satisfies the threshold.

(Supplementary Note 12)

The device of supplementary note 8, wherein the one or more processors are further configured to:
identify a predetermined sequence of image acquisition devices; and
wherein the one or more processors, when selecting the second image, are further configured to select the second image based on identifying the predetermined sequence of image acquisition devices.

(Supplementary Note 13)

The device of claim 8, wherein the one or more processors are further configured to:
acquire a third image of the user;
select the first image to be compared to the third image, based on the first image being acquired more recently than as compared to the second image;
compare the third image and the first image, based on the selection of the third image; and
perform another user identification of the user, based on the comparison of the third image and the first image.

(Supplementary Note 14)

The device of claim 8, wherein the one or more processors are further configured to:
identify that a second acquisition location of the second image is a closest acquisition location to a first acquisition location of the first image; and
wherein the one or more processors, when selecting the second image, are further configured to select the second image based on identifying that the second acquisition location of the second image is the closest acquisition location to the first acquisition location.

(Supplementary Note 15)

A computer-readable medium that stores a program comprising instructions, the instructions comprising: one or more instructions that, when executed by one or more processors of a device, cause the one or more processors to:
- acquire a first image of the user;
- select a second image of the user that is associated with a previous user identification of the user, based on the acquisition of the first image;
- compare the first image and the second image, based on the selection of the second image; and
- perform the user identification, based on the comparison of the first image the second image.

(Supplementary Note 16)

The computer-readable medium of claim 15, wherein the one or more instructions further cause the one or more processors to:
- identify that a timeframe associated with a first acquisition time of the first image and a second acquisition time of the second image satisfies a threshold; and
- wherein the one or more instructions, that cause the one or more processors to select the second image, further cause the one or more processors to select the second image based on identifying that the timeframe satisfies the threshold.

(Supplementary Note 17)

The computer-readable medium of claim 15, wherein the one or more instructions further cause the one or more processors to:
- identify that the second image is a most recent image of the user for which the previous user identification has been performed; and
- wherein the one or more instructions, that cause the one or more processors to select the second image, further cause the one or more processors to select the second image based on identifying that the second image is the most recent image of the user.

(Supplementary Note 18)

The computer-readable medium of claim 15, wherein the one or more instructions further cause the one or more processors to:
- identify that a distance associated with a first acquisition location of the first image and a second acquisition location of the second image satisfies a threshold; and
- wherein the one or more instructions, that cause the one or more processors to select the second image, further cause the one or more processors to select the second image based on identifying that the distance satisfies the threshold.

(Supplementary Note 19)

The computer-readable medium of claim 15, wherein the one or more instructions further cause the one or more processors to:
- identify a predetermined sequence of image acquisition devices; and
- wherein the one or more instructions, that cause the one or more processors to select the second image, further cause the one or more processors to select the second image based on identifying the predetermined sequence of image acquisition devices.

(Supplementary Note 20)

The computer-readable medium of claim 15, wherein the one or more instructions further cause the one or more processors to:
- identify that a second acquisition location of the second image is a closest acquisition location to a first acquisition location of the first image; and
- wherein the one or more instructions, that cause the one or more processors to select the second image, cause the one or more processors to select the second image based on the identifying that the second acquisition location is the closest acquisition location.

(Supplementary Note 21)

A non-transitory computer-readable medium storing instructions, the instructions comprising: one or more instructions that, when executed by one or more processors of a device, cause the one or more processors to:
- acquire a first image of the user;
- select a second image of the user that is associated with a previous user identification of the user, based on the acquisition of the first image;
- compare the first image and the second image, based on the selection of the second image; and
- perform the user identification, based on the comparison of the first image the second image.

This application is based upon and claims the benefit of priority from U.S. provisional patent application No. 62/926,125, filed Oct. 25, 2019, the disclosure of which is incorporated herein in its entirety.

What is claimed is:

1. A method for performing a user identification of a user, the method comprising:
   - acquiring a first image of the user;
   - selecting a second image of the user that is associated with a previous user identification of the user, based on the acquisition of the first image;
   - comparing the first image and the second image, based on the selection of the second image;
   - performing the user identification, based on the comparison of the first image the second image;
   - acquiring a third image of the user, the third image being acquired more recently than the first image and the second image;
   - selecting the first image to be compared to the third image, based on the first image being acquired more recently than the second image;
   - comparing the third image and the first image, based on the selection of the first image; and
   - performing another user identification of the user, based on the comparison of the third image and the first image.

2. The method of claim 1, further comprising:
   - identifying that a timeframe associated with a first acquisition time of the first image and a second acquisition time of the second image satisfies a threshold; and
   - wherein the selection of the second image comprises selecting the second image based on identifying that the timeframe satisfies the threshold.

3. The method of claim 1, further comprising:
   - identifying that the second image is a most recent image of the user for which the previous user identification has been performed; and
   - wherein the selection of the second image comprises selecting the second image based on identifying that the second image is the most recent image of the user.

4. The method of claim 1, further comprising:
   - identifying that a distance associated with a first acquisition location of the first image and a second acquisition location of the second image satisfies a threshold; and
   - wherein the selection of the second image comprises selecting the second image based on identifying that the distance satisfies the threshold.

5. The method of claim 1, further comprising:
identifying a predetermined sequence of image acquisition devices; and
wherein the selection of the second image comprises selecting the second image based on identifying the predetermined sequence of image acquisition devices.

6. The method of claim 1, further comprising:
identifying that a second acquisition location of the second image is a closest acquisition location to a first acquisition location of the first image; and
wherein the selection of the second image comprises selecting the second image based on identifying that the second acquisition location of the second image is the closest acquisition location to the first acquisition location.

7. A device for performing a user identification of a user, the device comprising:
a memory configured to store one or more instructions; and
one or more processors configured to execute the one or more instructions to:
acquire a first image of the user;
select a second image of the user that is associated with a previous user identification of the user, based on the acquisition of the first image;
compare the first image and the second image, based on the selection of the second image;
perform the user identification, based on the comparison of the first image the second image;
acquire a third image of the user, the third image being acquired more recently than the first image and the second image;
select the first image to be compared to the third image, based on the first image being acquired more recently than the second image;
compare the third image and the first image, based on the selection of the first image; and
perform another user identification of the user, based on the comparison of the third image and the first image.

8. The device of claim 7, wherein the one or more processors are further configured to:
identify that a timeframe associated with a first acquisition time of the first image and a second acquisition time of the second image satisfies a threshold; and
wherein the one or more processors, when selecting the second image, are further configured to select the second image based on identifying that the timeframe satisfies the threshold.

9. The device of claim 7, wherein the one or more processors are further configured to:
identify that the second image is a most recent image of the user for which the previous user identification has been performed; and
wherein the one or more processors, when selecting the second image, are further configured to select the second image based on identifying that the second image is the most recent image of the user.

10. The device of claim 7, wherein the one or more processors are further configured to:
identify that a distance associated with a first acquisition location of the first image and a second acquisition location of the second image satisfies a threshold; and
wherein the one or more processors, when selecting the second image, are further configured to select the second image based on identifying that the distance satisfies the threshold.

11. The device of claim 7, wherein the one or more processors are further configured to:
identify a predetermined sequence of image acquisition devices; and
wherein the one or more processors, when selecting the second image, are further configured to select the second image based on identifying the predetermined sequence of image acquisition devices.

12. The device of claim 7, wherein the one or more processors are further configured to:
identify that a second acquisition location of the second image is a closest acquisition location to a first acquisition location of the first image; and
wherein the one or more processors, when selecting the second image, are further configured to select the second image based on identifying that the second acquisition location of the second image is the closest acquisition location to the first acquisition location.

13. A non-transitory computer-readable medium that stores a program comprising instructions, the instructions comprising: one or more instructions that, when executed by one or more processors of a device, cause the one or more processors to:
acquire a first image of a user;
select a second image of the user that is associated with a previous user identification of the user, based on the acquisition of the first image;
compare the first image and the second image, based on the selection of the second image;
perform the user identification, based on the comparison of the first image the second image;
acquire a third image of the user, the third image being acquired more recently than the first image and the second image;
select the first image to be compared to the third image, based on the first image being acquired more recently than the second image;
compare the third image and the first image, based on the selection of the first image; and
perform another user identification of the user, based on the comparison of the third image and the first image.

14. The computer-readable medium of claim 13, wherein the one or more instructions further cause the one or more processors to:
identify that a timeframe associated with a first acquisition time of the first image and a second acquisition time of the second image satisfies a threshold; and
wherein the one or more instructions, that cause the one or more processors to select the second image, further cause the one or more processors to select the second image based on identifying that the timeframe satisfies the threshold.

15. The computer-readable medium of claim 13, wherein the one or more instructions further cause the one or more processors to:
identify that the second image is a most recent image of the user for which the previous user identification has been performed; and
wherein the one or more instructions, that cause the one or more processors to select the second image, further cause the one or more processors to select the second image based on identifying that the second image is the most recent image of the user.

16. The computer-readable medium of claim 13, wherein the one or more instructions further cause the one or more processors to:

identify that a distance associated with a first acquisition location of the first image and a second acquisition location of the second image satisfies a threshold; and wherein the one or more instructions, that cause the one or more processors to select the second image, further cause the one or more processors to select the second image based on identifying that the distance satisfies the threshold.

17. The computer-readable medium of claim 13, wherein the one or more instructions further cause the one or more processors to:

identify a predetermined sequence of image acquisition devices; and wherein the one or more instructions, that cause the one or more processors to select the second image, further cause the one or more processors to select the second image based on identifying the predetermined sequence of image acquisition devices.

18. The computer-readable medium of claim 13, wherein the one or more instructions further cause the one or more processors to:

identify that a second acquisition location of the second image is a closest acquisition location to a first acquisition location of the first image; and wherein the one or more instructions, that cause the one or more processors to select the second image, cause the one or more processors to select the second image based on the identifying that the second acquisition location is the closest acquisition location.

* * * * *